March 11, 1930. J. A. STRIPLING 1,750,066
GATE
Filed April 20, 1928 2 Sheets-Sheet 1
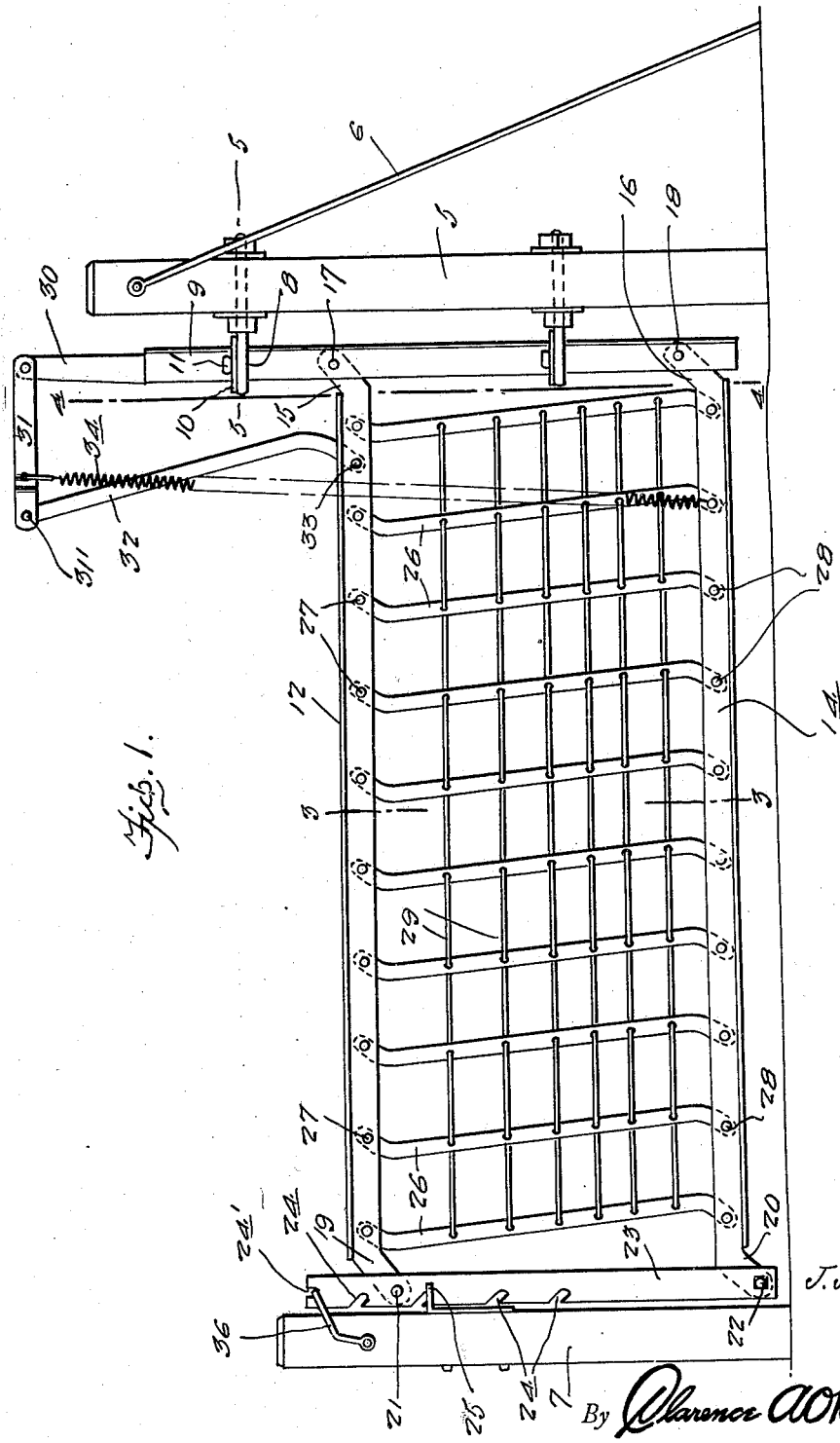
Inventor
J. A. Stripling
By Clarence A. O'Brien
Attorney March 11, 1930.  J. A. STRIPLING  1,750,066
GATE
Filed April 20, 1928    2 Sheets-Sheet 2
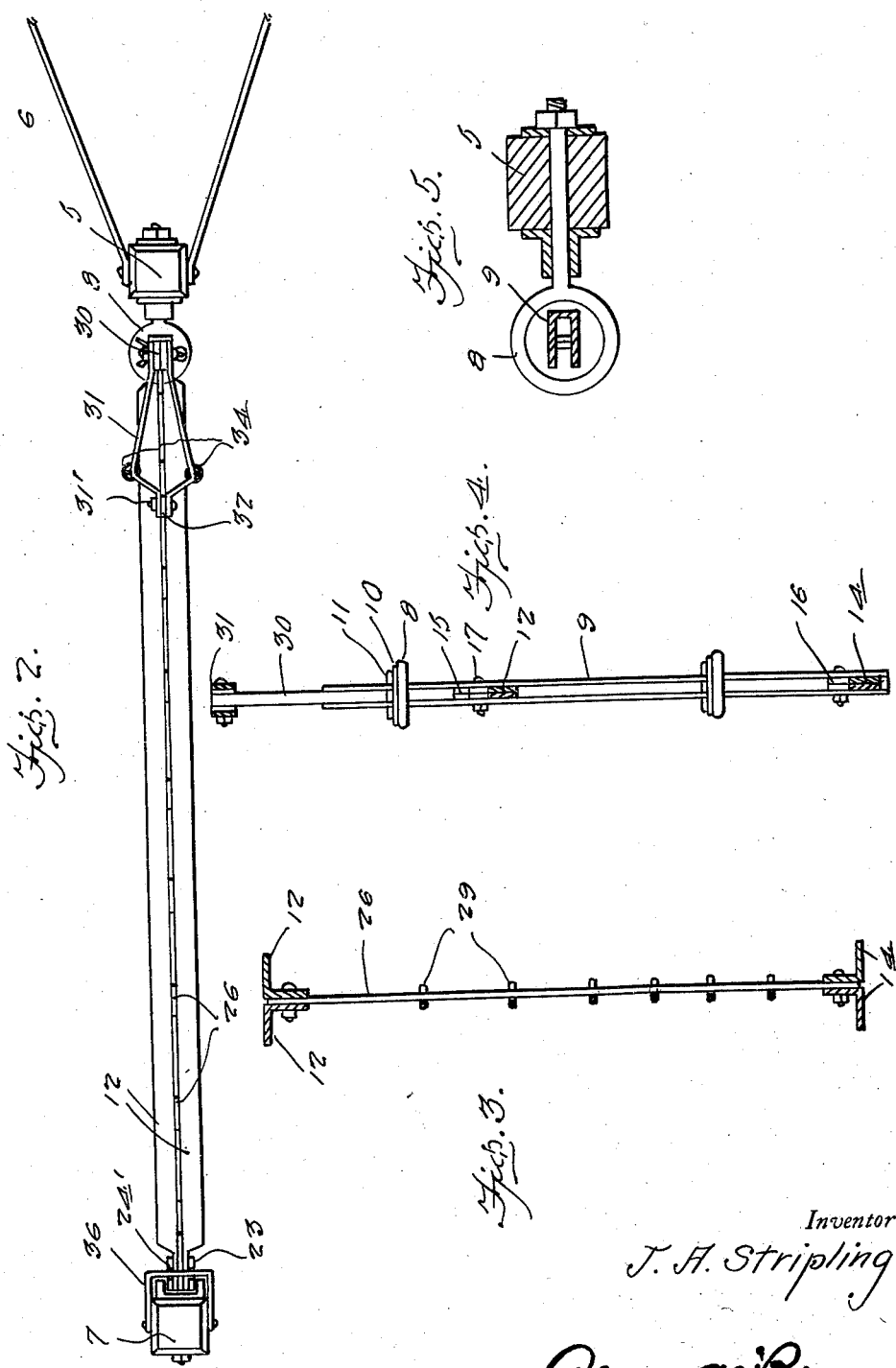
Inventor
J. A. Stripling
By Clarence A. O'Brien
Attorney Patented Mar. 11, 1930

1,750,066

UNITED STATES PATENT OFFICE

JULIUS A. STRIPLING, OF FORT DODGE, IOWA

GATE

Application filed April 20, 1928. Serial No. 271,514.

The present invention relates to a gate, and has for its prime object to provide a gate structure which is capable of swinging vertically as well as horizontally.

Another very important object of the invention resides in the provision of a gate structure of this nature having spring means associated therewith for normally swinging the gate to a closed position, a further very important object of the invention residing in the provision of a gate structure of this nature which is simple, strong and durable, inexpensive to manufacture, thoroughly efficient and reliable in use.

With the above and numerous other objects in view as will appear as the description proceeds, the invention resides in certain novel details of construction and in the combination and arrangement of parts as will be hereinafter more fully described and claimed.

In the drawing:

Figure 1 is a side elevation of the gate structure embodying the features of my invention.

Figure 2 is a top plan view thereof.

Figure 3 is a vertical section taken substantially on the line 3—3 of Figure 1.

Figure 4 is another vertical section taken substantially on the line 4—4 of Figure 1.

Figure 5 is a horizontal section taken substantially on the line 5—5 of Figure 1.

Referring to the drawing in detail, it will be seen that the numeral 5 denotes one post which is braced as at 6 and the numeral 7 denotes another post disposed in spaced parallellism to the post 5. A pair of eye bolts 8 extend through the post 5 toward the post 7, being disposed in spaced horizontal planes. A channel bar 9 is rotatably extended through the eyes of the eye bolts 8 having washers 10 thereon held in place by pins 11 extending through the channel bar 9. A pair of upper bars 12 and a pair of lower bars 14 have upwardly offset ends 15 and 16 respectively pivotally mounted in the channel bar 9, as at 17 and 18 respectively, the pivot 17 being disposed above the lower eye bolt 8 and below the upper eye bolt 8, while the pivot 18 is disposed below the lower eye bolt 8 adjacent the lower end of the channel bar 9. The other ends of the pairs of bars 12 and 14 are offset downwardly as is indicated at 19 and 20 respectively, and are pivotally engaged, as at 21 and 22 respectively, in a channel bar 23, which is provided with a series of notches 24 along its edge and with a notch 24' at its upper end. A stop bracket 25 is disposed on the post 7, against which the channel bar 23 may abut when swung to a closed position. A plurality of rods 26 are pivotally engaged between bars 12 at spaced intervals as is indicated at 27 and are also pivotally connected between bars 14 at spaced intervals as indicated at 28.

A plurality of wires 29 are secured to the end rods 26 and pass through openings in the intermediate rods 26. A riser 30 extends upwardly from the upper end of the channel bar 9 and supports a bracket 31 which comprises a pair of arms diverging from each other toward the post 7 and then merging into converging portions, the terminals of which have mounted therein a pivot bolt 31', with which is pivotally engaged a hanger rod 32, which is pivotally engaged between the bars 12 as indicated at 33. Springs 34 are engaged with the outermost portions of the bracket 31 and with pins 28 adjacent the pin 28 next to the channel bars 9. Each spring is normally adapted to hold the gate in a raised position, it being understood that the pairs of bars 12 and 14 will pivot at 17 and 18, so that the ends 19 and 20 and the channel bar 23 will raise upwardly. The gate is held closed by a hasp 36 pivoted on the gate and engaged in the notch 24' although the gate may be held in a partially raised position by engaging this hasp in any one of the notches 24. It will be seen that the gate may be swung horizontally by the channel bar 9 rotating in the eyes of the eye bolts 8. It is thought that the construction, operation and advantages of this invention will now be quite apparent to those skilled in this art, without a more detailed description thereof. The present embodiment of the invention has been disclosed in detail merely by way of example.

In actual practice it attains the features of advantage enumerated as desirable in the statement of the invention and the above description. It will be apparent that changes in the details of construction and in the combination and arrangement of parts may be resorted to, without departing from the spirit or scope of the invention as hereinafter claimed or sacrificing any of its advantages.

Having thus described my invention, what I claim as new is:

1. In a gate structure of the class described, a pair of spaced longitudinal channel bars, a pair of upper gate bars pivotally engaged at adjacent ends in an intermediate portion of the respective channel bars, a pair of lower gate bars pivotally mounted in the lower portions of the respective channel bars, a plurality of rods pivotally engaged between the pairs of gate bars, and a plurality of wires extending transversely across the rods, a riser on one of said channel bars, a bracket on said riser, a hanger pivotally engaged with the bracket and pivotally engaged with the upper pair of gate bars, and spring means engaged with the bracket and the lower pair of gate bars for normally raising said bars.

2. In a gate structure of the class described, a pair of spaced longitudinal channel bars, a pair of upper gate bars pivotally engaged at adjacent ends in an intermediate portion of the respective channel bars, a pair of lower gate bars pivotally mounted in the lower ends of the respective channel bars, a plurality of rods pivotally engaged between the pairs of gate bars, a plurality of wires extending transversely across the rods, a riser on one of said channel bars, a bracket embodying a pair of arms diverging from each other from the riser and then merging into the converging portion extending laterally from the upper end of said riser, a hanger rod, one end of said rod being pivotally mounted between the terminals of the bracket arms, the other ends of said rod being pivotally engaged between the upper pair of said gate bars, and spring members engaged with each of said bracket arms and with one of said lower pair of gate bars respectively.

In testimony whereof I affix my signature.

JULIUS A. STRIPLING.